US006981708B1

(12) United States Patent
Tucker et al.

(10) Patent No.: US 6,981,708 B1
(45) Date of Patent: Jan. 3, 2006

(54) SHOPPING CART BASKET

(75) Inventors: James B. Tucker, Dunnesville, VA (US); Verlyn C. Ruger, Bellevue, MI (US); Larry S. Hubbard, Hastings, MI (US)

(73) Assignee: United Steel & Wire Company, Battle Creek, MI (US)

( * ) Notice: Subject to any disclaimer, the term of this patent is extended or adjusted under 35 U.S.C. 154(b) by 0 days.

(21) Appl. No.: 11/046,331

(22) Filed: Jan. 28, 2005

(51) Int. Cl.
*B62B 3/02* (2006.01)

(52) U.S. Cl. .......................... 280/33.992; 280/33.991; 280/DIG. 4

(58) Field of Classification Search ........... 280/33.991, 280/33.992, 33.996, 33.997, 33.995, DIG. 4, 280/33.993, 33.994, 47.34
See application file for complete search history.

(56) References Cited

U.S. PATENT DOCUMENTS

| | | | |
|---|---|---|---|
| 3,341,060 A | | 9/1967 | Kehrig et al. |
| 3,390,808 A | | 7/1968 | Kehrig et al. |
| 3,419,182 A | | 12/1968 | Gildart |
| 3,999,774 A | * | 12/1976 | Rehrig ................... 280/33.991 |
| 4,619,371 A | | 10/1986 | Rehrig |
| 4,632,411 A | * | 12/1986 | Badger ................... 280/33.991 |
| 4,650,199 A | * | 3/1987 | Rehrig ................... 280/33.997 |
| 4,865,338 A | * | 9/1989 | Rehrig ................... 280/33.992 |
| 4,946,059 A | | 8/1990 | Rehrig |
| D311,983 S | | 11/1990 | Rehrig |
| 5,255,930 A | * | 10/1993 | Jones et al. ............. 280/33.992 |
| 5,289,936 A | * | 3/1994 | Jones et al. ................. 220/4.28 |
| 5,441,288 A | * | 8/1995 | Rehrig ................... 280/33.991 |
| 5,458,347 A | * | 10/1995 | Chiv ....................... 280/33.992 |
| 5,791,666 A | * | 8/1998 | Mainard ................. 280/33.991 |
| 5,794,952 A | * | 8/1998 | Kern et al. ............. 280/33.991 |
| 5,865,448 A | * | 2/1999 | Kern et al. ............. 280/33.992 |
| 5,947,313 A | * | 9/1999 | Kern et al. ................. 220/4.01 |
| 6,488,292 B2 | * | 12/2002 | O'Quin ................... 280/33.991 |
| 2003/0116933 A1 | * | 6/2003 | Nadeau et al. ......... 280/33.991 |
| 2003/0197339 A1 | * | 10/2003 | D'Angelo .............. 280/33.991 |

* cited by examiner

*Primary Examiner*—J. Allen Shriver
(74) *Attorney, Agent, or Firm*—Flynn, Thiel, Boutell & Tanis, PC

(57) ABSTRACT

A molded plastic basket associated with a wheeled shopping cart, which plastic basket has a generally U-shaped support rod engaged within an elongate channel extending along upper edges of the side and front walls of the basket. The support rod has constructional features to provide for desirable supportive engagement and reinforcement of the upper edge of the basket while at the same time permitting coupling of the support rod and basket to the rear frame uprights to facilitate assembly while providing desirable load transmission from the basket to the upright frame elements.

16 Claims, 5 Drawing Sheets

SHOPPING CART BASKET

FIELD OF THE INVENTION

This invention relates to a wheeled shopping cart and, more specifically, to improvements associated with a plastic basket as provided on the cart.

BACKGROUND OF THE INVENTION

Wheeled shopping carts as conventionally utilized in department stores, supermarkets and related environments typically employ a large upwardly-opening basket for accommodating merchandise therein. The basket normally has a rear wall, known as a rear gate, associated with the handle end thereof and pivotally supported adjacent its upper edge to permit such carts to be nested one within another during storage of the carts. This rear gate also conventionally mounts a foldable seat assembly thereon for accommodating a small child. Many of these carts construct the basket of plastics material, with such basket frequently being of a one-piece molded plastic construction defining the bottom, front and opposed side walls.

In one known cart employing a molded plastic basket, a closed metal loop or ring cooperates with the upper edge of the basket and extends totally therearound for coupling the basket to the cart frame. In this construction, the front and side walls of the basket have an outwardly opening channel extending along the upper edges thereof, and the closed ring fits in this channel so as to provide an engagement with the upper edge of the basket around the three sides thereof, and the closed ring extends exteriorly around the upright frame rods which support the basket handle so that a fourth side of the ring extends transversely across the rear of the basket in the vicinity of the upper edge of the rear gate. The closed ring is typically resiliently engaged with the basket, which in an earlier construction employed a plurality of metal tabs protruding upwardly from the ring for engagement within recesses formed in the top wall of the channel, and which in a current construction employs resilient protrusions molded integrally with the walls defining the channel so as to permit the ring to be resiliently snapped into the channel. A cart employing a basket of this type, namely having a continuous closed loop or ring extending around the basket and across the rear of the basket, is believed to result in undesired complexity with respect to assembly inasmuch as the upper walls of the basket have to be deformed and then moved into engagement with the ring after the ring has been positioned so as to extend around the handle frame uprights. Examples of this construction are disclosed by U.S. Pat. Nos. 3,999,794, 4,650,199 and D 247,953.

In an alternate construction of a shopping cart employing a plastic basket, the basket may be formed of one or more molded plastic pieces, and an outwardly opening channel extends along upper edges of the front and side walls thereof. A reinforcing element, such as an elongate metal rod formed into a U-shaped configuration, is engaged within the channel associated with the front and side walls. In this construction, the side legs of the U-shaped support rod are slidably inserted through small tunnel-like structures associated with the channel on the side walls for captivating the legs of the support rod. This construction does offer the advantage of not having to loop the support rod around the frame handles inasmuch as the support rod is of an open U-shaped configuration. Examples of constructions of this type are illustrated by U.S. Pat. Nos. 5,255,930 and 5,289,936.

The baskets associated with shopping carts are also frequently provided with stops associated with the side walls of the basket in the vicinity of the front wall so as to prevent the rear gate associated with a front nested cart from falling downwardly into the basket provided on an adjacent rearmost nested cart. For this purpose, various types of gate supports have been proposed, including providing a molded gate support on the upper inner edges of the basket side walls, or providing L-shaped metal brackets which secure to the metal support ring and which protrude upwardly and then inwardly over the top of the basket side wall so as to function as a gate stop. These constructions, as exemplified by U.S. Pat. No. 5,865,448, may perform as a gate stop in a satisfactory manner but require either increased complexities with respect to molding of the basket due to regions of increased material thickness, or increased complexities associated with forming of the support loop by requiring gate stops protruding above the top edges of the basket side walls, which stops also detract from appearance and result in protruding edges which can be harmful.

Accordingly, it is an object of this invention to provide a molded plastic basket for a shopping cart which is believed to improve upon known constructions of the types briefly summarized above. More particularly, this invention relates to a molded plastic basket associated with a wheeled shopping cart, which plastic basket has a generally U-shaped support rod engaged within an elongate channel extending along upper edges of the side and front walls of the basket, which support rod has constructional features to provide for desirable supportive engagement and reinforcement of the upper edge of the basket while at the same time permitting coupling of the support rod and basket to the rear frame uprights to facilitate assembly while providing desirable load transmission from the basket to the upright frame elements.

In the improved basket construction, as aforesaid, integral and monolithic protrusions on the support ring cooperate with the basket to simplify assembly of the support ring and basket while at the same time enabling the protrusions to function as gate stops positioned adjacent the upper edges of the side walls in the vicinity of the front wall. The gate stops create minimal visual disruption without creating any undesired sharp corners or edges.

In the improved shopping cart basket construction of this invention, the basket is preferably of a molded one-piece plastic construction which defines the bottom wall, an upright front wall and a pair of opposed upright side walls, whereby the basket defines a large upwardly-opening storage compartment which is closed at its rear end by a separate rear gate assembly. The molded plastic basket has an outwardly-opening channel extending lengthwise along the front and side walls adjacent the upper edge thereof, and a generally U-shaped support rod is engaged within this channel. The support rod is formed from an elongate monolithic wire rod which is bent into a U-shaped form so as to have a front bight joined through rounded corners to a pair of cantilevered side legs which diverge relative to one another as they project toward their rear free ends. The side legs, at a location positioned adjacent but spaced rearwardly a small distance from the front bight, have U-shaped protrusions formed therein, as by a bending operation, with these protrusions protruding horizontally inwardly in generally opposed relationship to one another. The U-shaped support rod is mounted in the channel of the basket by slidably inserting the side legs into the channel parts along the upper edges of the side walls, which channel parts at spaced locations have loops extending thereover to effect closure of the channel at selected locations, whereby the legs slide through the loops for confinement in the channel. The side walls of the basket, adjacent but rearwardly of the front wall, also have small openings therethrough in communication with the channel. The insertion of the support rod into the channel causes the U-shaped protrusions to align with and pass through the openings in the side walls so that the protrusions protrude inwardly through the side walls beyond the inner surface thereof so as to permit their functioning as gate stops when baskets of like carts are nested. The protrusions also effectively lock the support rod relative to the basket in the longitudinal (i.e., front-to-back) direction thereof. The rear edges of the basket side walls abut against or are engaged with upright frame elements which define the rear handle of the basket, and these rear frame elements have openings in front sides thereof which align with the channel so that rear free ends of the side legs of the support rod can protrude into the openings formed in the upright frame elements, the latter preferably being hollow tubes, thereby restraining sideward or vertical movement of the rear ends of the support rod legs, and also permitting load as imposed from the basket on the support rod to be transferred directly onto the rear frame elements.

Other objects and purposes of the invention will be apparent to persons familiar with constructions of this type upon reading the following specification and inspecting the accompanying drawings.

Figure 1:
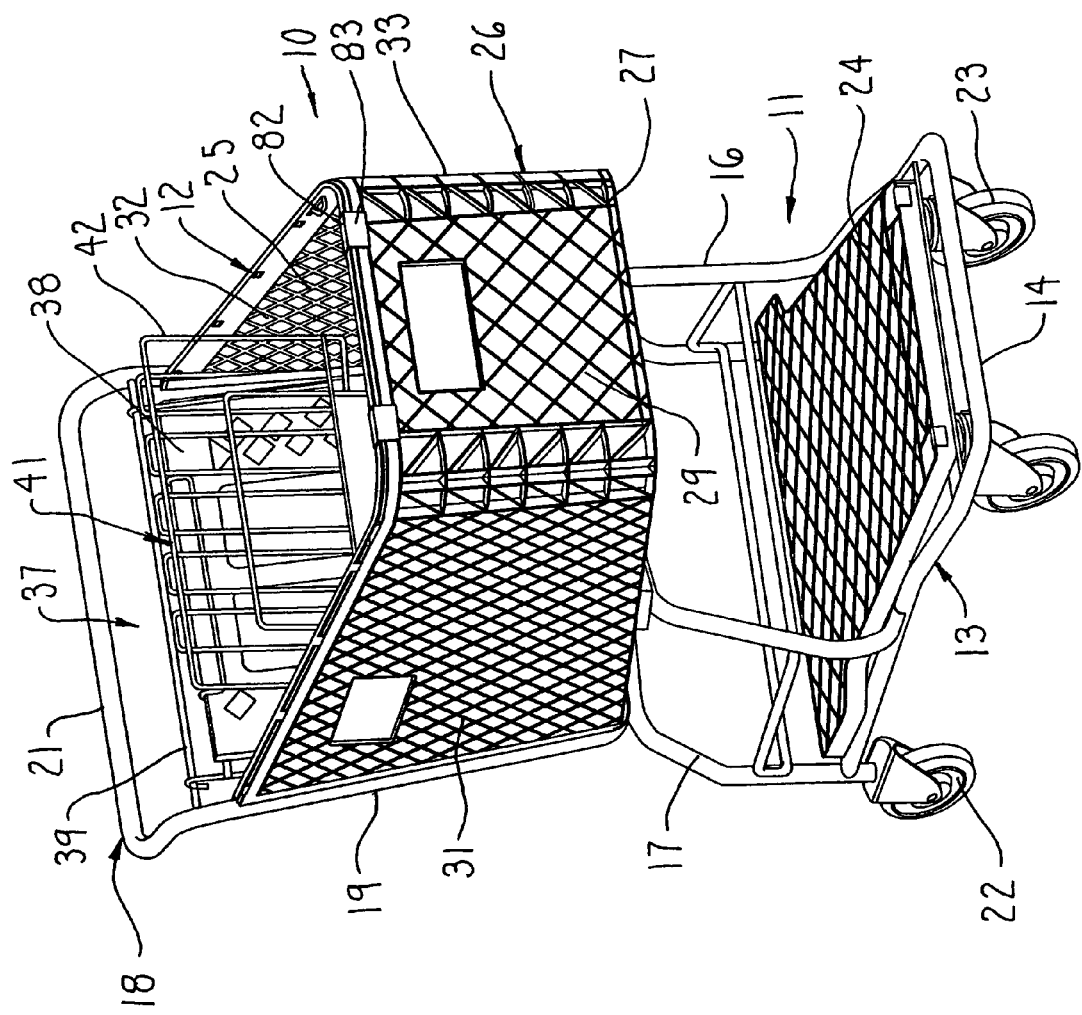
FIG. 1 is a perspective view of a wheeled shopping cart employing the improved basket construction of this invention.

In the following description, for convenience in reference only, the words "upwardly", "downwardly", "rightwardly" and "leftwardly" will refer to directions in the drawings to which reference is made; the word "rear" will refer to the end of the cart having the handle associated therewith, and the word "front" will refer to the opposite end of the cart; and the words "inward" and "outward" will respectively refer to directions toward and away from the geometric center of the cart and designated parts thereof. Said terminology will include the words specifically mentioned, derivatives thereof, and words of similar import.

DETAILED DESCRIPTION

FIG. 1 illustrates a wheeled shopping cart which includes a wheeled frame or base assembly 11 on which a basket arrangement 12 is supported.

The frame assembly 11 includes a generally rigid base frame 13 having a generally horizontally oriented U-shaped base member 14. Generally inverted U-shaped intermediate and rear basket supports 16 and 17 are fixed to and project upwardly from the base member 14 for engaging the underside of the basket arrangement 12. A generally inverted U-shaped or ring-shaped rear frame 18 includes a pair of generally parallel side legs or frame elements 19 which extend along and rigidly secure to the rear edges of the basket. The ring-shaped rear frame 18, adjacent the lower ends of the side legs 19, has a cross rod which is rigidly joined to the top cross rod of the rear upright 17. The upper ends of side legs 19 are joined by a cross rod or handle 21 which extends transversely across the cart adjacent the rear upper edge of the basket.

The frame assembly 11 includes a pair of wheels 22 mounted on the base frame 13 adjacent the rear end thereof, and a pair of casters 23 mounted on the base frame adjacent the front end thereof.

The basket arrangement 12 defines therein a large interior compartment 25 which opens upwardly for storage of merchandise therein. Additional storage space is provided by a bottom tray 24 which is supported on the U-shaped base member 14 at an elevation spaced downwardly from the bottom of the basket arrangement 12.

The basket arrangement 12 includes a molded one-piece plastic basket member 26 defined principally by an enlarged bottom wall 27 and an upright sidewall arrangement 28 which is joined to and projects upwardly from the outer edge of the bottom wall 27. The sidewall arrangement 28 defines an upright front wall 29, opposed right and left side walls 31 and 32 respectively, and rounded corners or corner walls 33 which couple between opposite ends of the front wall 29 and forward ends of the right and left side walls 31 and 32. The sidewall arrangement 28 hence extends around only three sides of the bottom wall, whereby the rear side of the one-piece basket member 26 is open.

Figure 9:
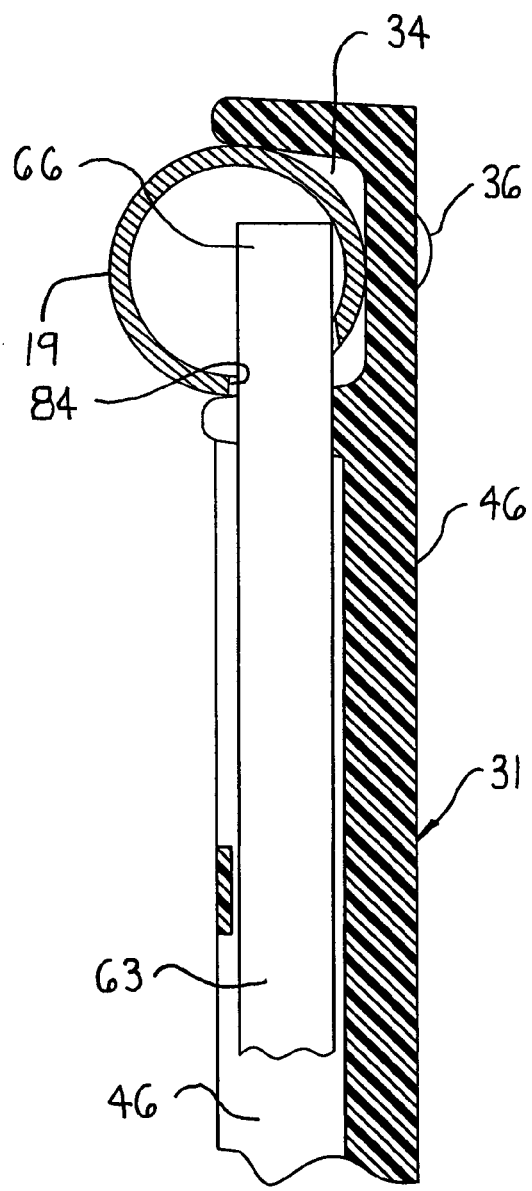
FIG. 9 is an enlarged fragmentary sectional view taken generally along line 9—9 in FIG. 2.

The basket member 26 is rigidly joined to the frame assembly 11, and in this regard each of the frame uprights 16 and 17 have cross members extending transversely under and supporting the bottom wall 29 of the basket member 26. In addition, the right and left side walls 31 and 32 each have a channel-like recess 34 extending adjacent the rear upright edge thereof, which recess accommodates one of the frame side legs 19, with the side leg 19 and basket member 26 being suitably fixed together, such as by rivets 36 (FIG. 9).

The basket arrangement 12 also includes a vertically swingable rear gate assembly 37 associated with the open rear side of the one-piece basket member 26 for normally closing off the rear side of the basket member. This rear gate assembly 37 includes a rear gate member 38 which is a vertically large generally planar member sized to extend generally horizontally between and vertically upwardly throughout the height of the side walls 31 and 32 adjacent the rear edges thereof. This rear gate member 38 is vertically pivotally supported on a horizontal hinge rod or shaft 39 which extends transversely between the side frame elements 19 at a location adjacent the rear upper edge of the basket arrangement. The lower edge of the gate member 38 is adapted to abut against a stop formed adjacent the lower rear of the basket member 26 so as to normally retain the gate member in an upright position wherein it effectively closes off the open rear side of the basket member, while at the same time enabling the gate member 38 to swing inwardly and upwardly about the hinge rod 39 when the basket of a second cart is nestingly inserted into the basket of a first cart.

The rear gate assembly 37 also includes a collapsible child seat assembly 41 which is mounted on and carried by the rear gate member 38. Such child seat assembly typically includes a separate back member 42 which is swingably carried on the rear gate member 38, and a seat member (not shown) is typically hingedly coupled at one end to one of the gate and back members, and is hingedly and slidably coupled at the other end to the other of the gate and back members.

The overall construction of the shopping cart as generally described above is conventional, and further detailed description thereof is believed unnecessary.

Figure 4:
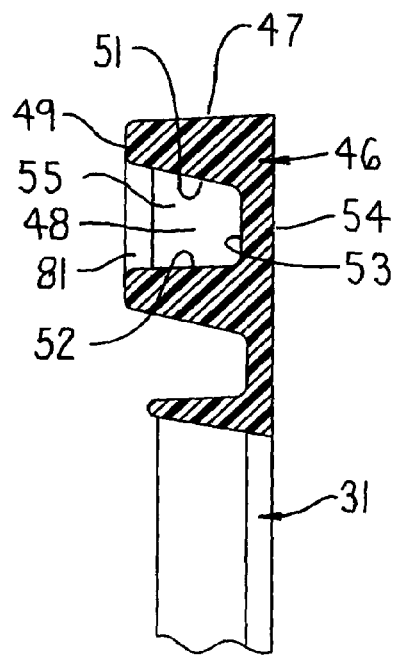
FIG. 4 is an enlarged, fragmentary sectional view showing the upper rim of the plastic basket, as taken along line 4—4 in FIG. 2.
Figure 5:
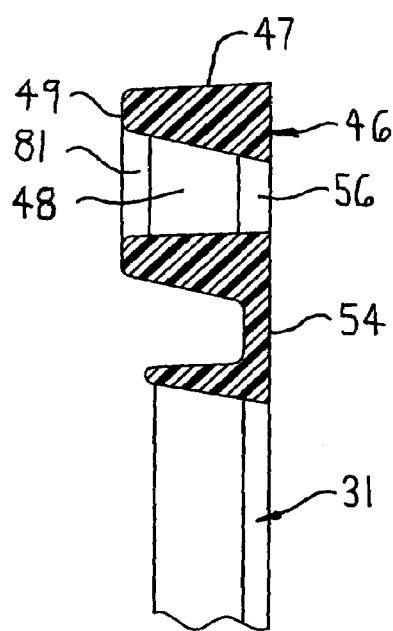
FIG. 5 is a sectional view similar to FIG. 4 but taken along line 5—5 in FIG. 2.

Referring now to FIGS. 4–5, and specifically the constructional details associated with the one-piece plastic basket member 26, this basket member includes a top rim 46 which extends along the entire upper edge of the generally U-shaped upright sidewall arrangement 28, which top rim 46 defines the upper edge or surface 47 of the basket. This top rim 46 defines therein a channel 48 which opens outwardly through the outer or exterior side surface 49 of the sidewall arrangement, which channel 48 is disposed downwardly only a small distance from the upper edge 47 of the top rim. Channel 48 (FIGS. 2, 4 and 5) in plan view is generally U-shaped since it extends across the full width of the front wall 29 and extends continuously around the rounded corner walls 33 and then projects lengthwise along the length of the respective right and left sidewalls 31 and 32, with the channel 48 effectively terminating at the channel-like recesses 34 (FIG. 9) which extend upwardly adjacent the rear upright edges of the side walls 31 and 32.

The channel 48, as illustrated by FIG. 4, extends vertically between generally opposed top and bottom walls 51 and 52. The channel as it opens inwardly through the exterior side of the respective basket side wall is closed at the bottom thereof by an upright base wall 53, the latter being spaced outwardly from the inner or interior side surface 54 of the basket. Access to the channel 48 is thus through the open mouth 55 thereof, as effectively defined in the exterior side surface 49 of the top rim.

Each of the right and left side walls 31 and 32 also has a small window-like opening 56 extending transversely (i.e. horizontally) through the top rim thereof, which openings are disposed transversely in generally opposed relationship to one another, and open outwardly through the top rim of the side wall from the interior surface thereof for direct communication with the base of the channel 48, as illustrated by FIG. 5.

The openings 56 have a height which approximately corresponds to the height of the channel 48 adjacent the base thereof, but these openings 56 are longitudinally elongated as defined between front and rear edge walls 57 and 58 (FIG. 8) so as to extend along the channel over a length which is several times greater than the height of the opening. In addition, the pair of opposed window-like openings 56 as defined in the side walls 31–32 are disposed in close proximity to, but spaced rearwardly a small distance from, the front wall 29 of the basket. In the illustrated arrangement, the front edge walls 57 of the openings 56 are formed substantially at, or slightly rearwardly from, the point where the straight side walls 31, 32 of the basket join and merge into the respective rounded corner walls 33.

Figure 3:
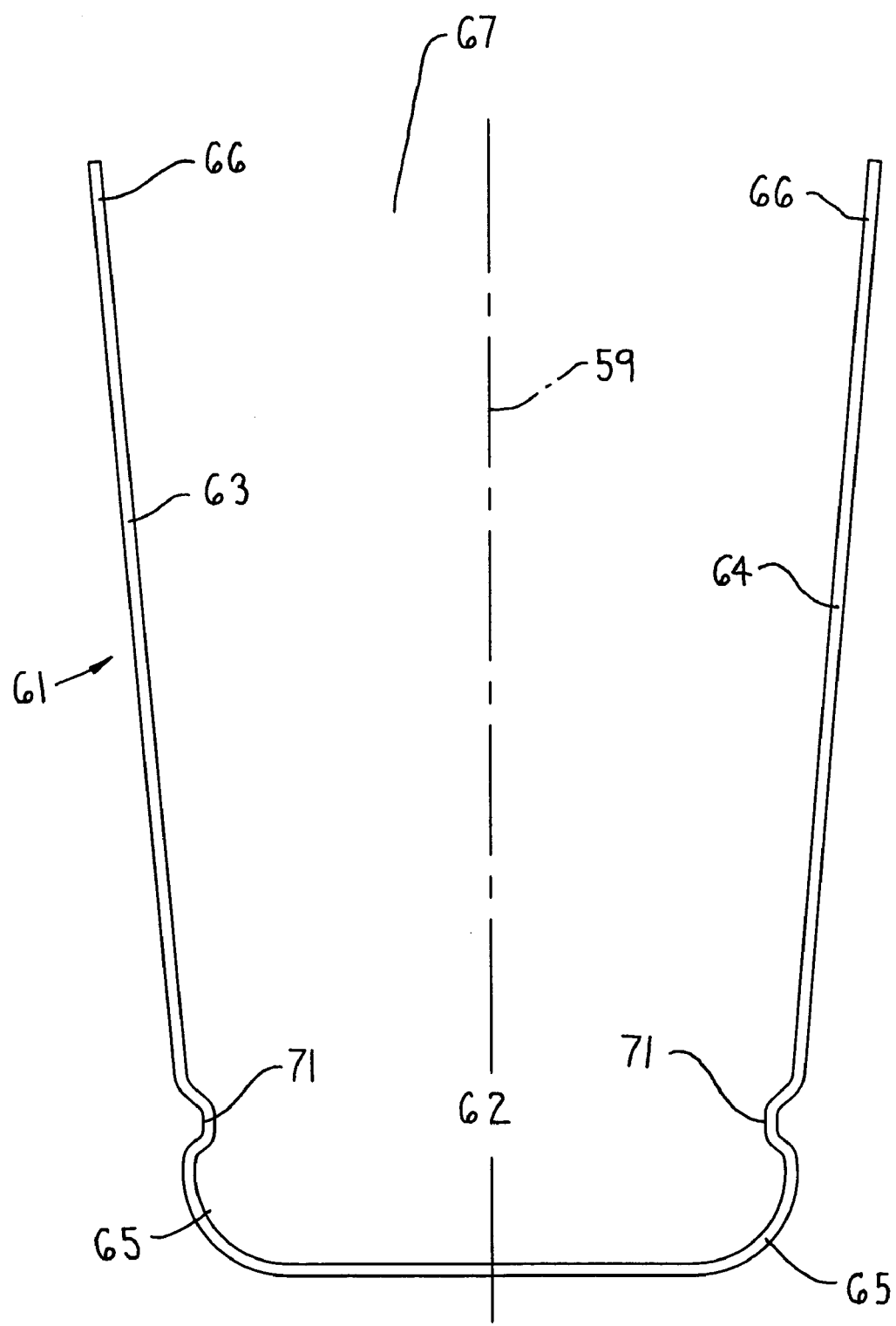
FIG. 3 is a plan view of a support ring which engages in a channel along the top rim of the plastic basket.

The channel 48 and the window-like openings 56 associated therewith are provided for cooperation with a generally U-shaped support or reinforcing rod 61. This support rod 61, as illustrated in FIG. 3, includes a generally straight front part or bight 62 which at opposite ends is joined to rounded corners 65 which in turn join to forward ends of right and left straight leg parts 63 and 64, respectively. The straight leg parts 63–64 are generally coplanar, and are cantilevered rearwardly in diverging relationship with respect to one another so as to terminate at free rear end parts 66. The U-shaped support rod 61 is generally symmetrical on opposite sides of a longitudinally extending centerline 59, and defines therein an open region 67 which is unobstructed and opens rearwardly between the rearwardly cantilevered side legs 63–64.

Each of the side legs 63–64 of the U-shaped support rod 61, in the front portion thereof, and more specifically directly adjacent where the side leg 63, 64 joins to the respective rounded front corner 65, is provided with a generally horizontally inwardly directed protrusion 71. This protrusion 71 is effectively horizontally cantilevered inwardly from its respective side leg 63–64 generally toward the opposite side leg 63–64, with the two protrusions 71 defined on the two side legs being disposed in generally aligned and opposed relationship to one another.

Figure 8:
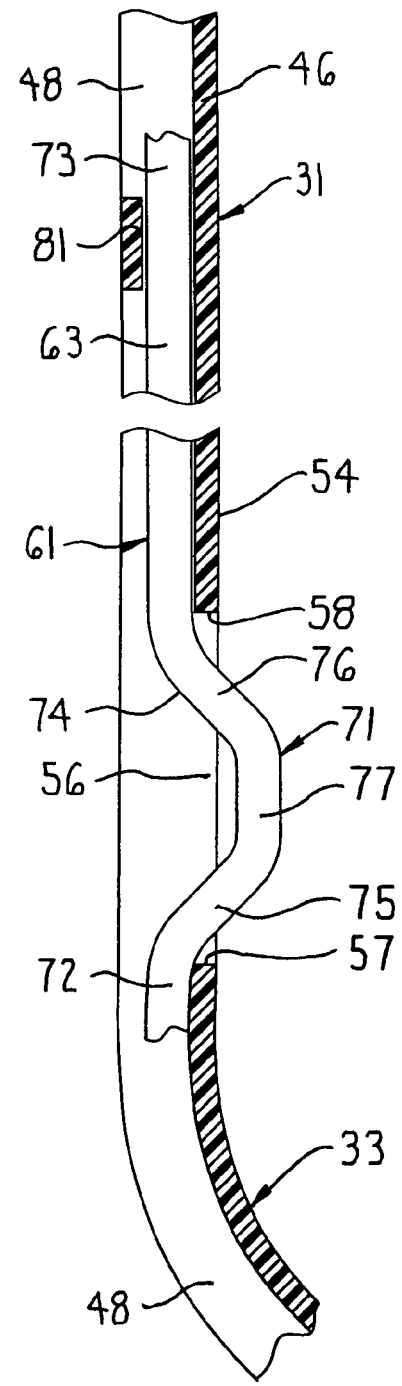
FIG. 8 is a fragmentary sectional view taken generally along line 8—8 in FIG. 7.

The protrusion 71, in the preferred embodiment, is integrally and monolithically joined to the respective side leg 63–64 of the support 61, such as by being bent inwardly relative to the respective leg 63–64. The protrusion 71 as illustrated by FIG. 8 includes a pair of inwardly protruding side legs 75–76 joined at inner ends through rounded corners to a bight part 77 which effectively defines the free end or nose of the protrusion. The protrusion 71 hence has a generally U-shaped or V-shaped or truncated V-shaped or loop-shaped configuration when viewed from above, and in the preferred construction defines a space or gap 74 between the side legs thereof, which gap 74 opens outwardly. The protrusion 71 and its associated gap 74 results in the respective side leg 63 or 64 effectively being defined by front and rear leg portions 72 and 73, with the front leg portion 72 being of zero or extremely short length so that the protrusion 71 is defined either at or closely adjacent the transition to the respective rounded front corner 33. The rear leg portion 73 of the respective side leg 63, 64 hence effectively defines not only a majority of the length of the respective side leg, but also defines substantially the entirety of the straight length thereof, except for the length occupied by the protrusion 71. It will be recognized, however, that the protrusion can be moved further rearwardly if desired, although the protrusion must still remain in a position where it is disposed more closely adjacent the front wall so as to permit it to function as a rear gate support, if needed, as described hereinafter.

Figure 6:
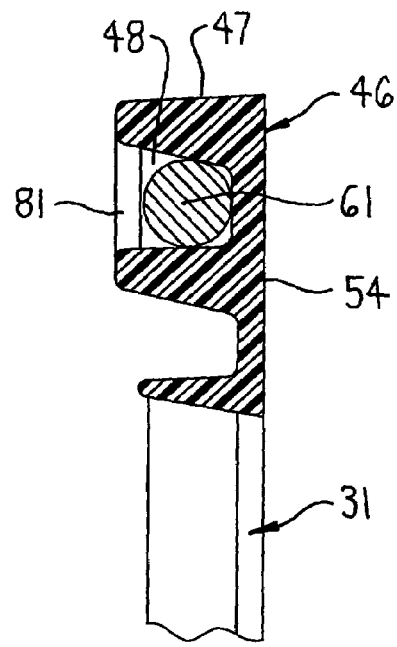
FIGS. 6 and 7 are sectional views which respectively correspond to FIGS. 4 and 5 but illustrate the support rod engaged within the channel of the basket top rim.

The U-shaped support rod 61, including the protrusions 71 thereof, is preferably formed as an integral and monolithic one-piece member by being suitably bent from an elongate one-piece metal (i.e. steel) rod, with the rod being suitably bent so as to effect forming of the rounded front corners 33 as well as forming of the protrusions 71. The rod member defining the support rod 61, as illustrated by FIG. 6, preferably has a round cross section. Other cross sections, however, can be utilized.

Figure 2:
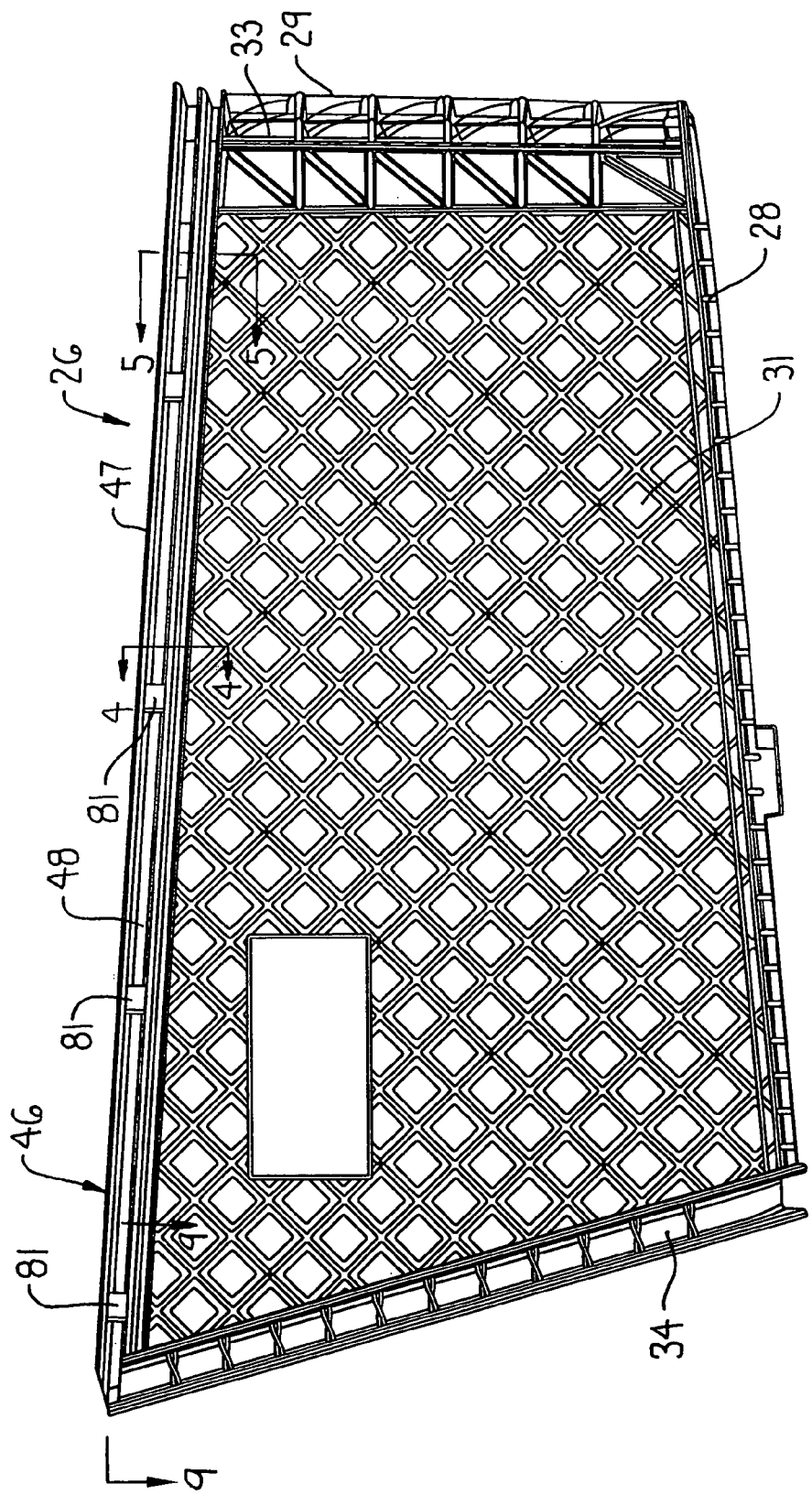
FIG. 2 is a side elevational view showing solely the plastic basket.

The U-shaped support rod 61 is adapted to be disposed and retained in the channel 48 which extends along the upper rim of the plastic basket 26, and the latter is additionally provided with retaining bands or strips 81 associated with each of the side walls 31–32 to assist in retaining the rod 61 within the channel 48. As illustrated by FIGS. 2 and 4, each side wall 31–32 has at least one, and in the illustrated embodiment two or more, retaining bands 81 which extend transversely (i.e., vertically) across the mouth of the channel 48 over a selected but short longitudinal length of the channel, whereby each retaining band 81 and its cooperation with the channel hence defines a tunnel-like structure. These retaining bands 81 are associated only with the right and left side walls 31–32, and are preferably disposed a substantial distance rearwardly from the window-like openings 56. In the illustrated arrangement, each side wall preferably has one said band 81 disposed across the channel approximately midway between the front and rear of the basket, and has a further retaining band 81 extending across the channel at a location disposed more closely adjacent the rear edge of the respective side wall.

The basket 26, as illustrated in FIG. 1, also mounts a pair of U-shaped channel members 82 which further assist in retaining the support rod 61 within the basket channel 48. The pair of channel members 82 open downwardly and fit downwardly over the upper edge of the front wall 29 in sidewardly spaced relationship thereon. The channel members 82 have front legs 83 which project downwardly a sufficient extent so as to project over and hence close off the open mouth of the channel 48 to assist in retaining the front part of the support rod 61 therein. These channel members 82 can also be retained in position by means of rivets or the like.

When the support rod 61 is mounted and retained within the channel 48 of the basket 26, the rear free end parts 66 associated with the leg 63–64 protrude through a small opening 84 formed in the side wall of the handle side leg 19, as illustrated in FIG. 9, whereby the side leg 63, 64 hence can bear against the bottom edge of the opening 84 so as to permit transfer of loads from the basket 26 through the side leg 63, 64 to the frame side legs 19. The projection of the side leg 63, 64 through the opening 84 also prevents the side leg from moving or deflecting outwardly away from the basket side wall.

To assemble the cart 10, the basket member 26 is normally initially secured to the frame, such as by being riveted to the top cross rod of the frame support 16 and to the frame side members 19.

Figure 7:
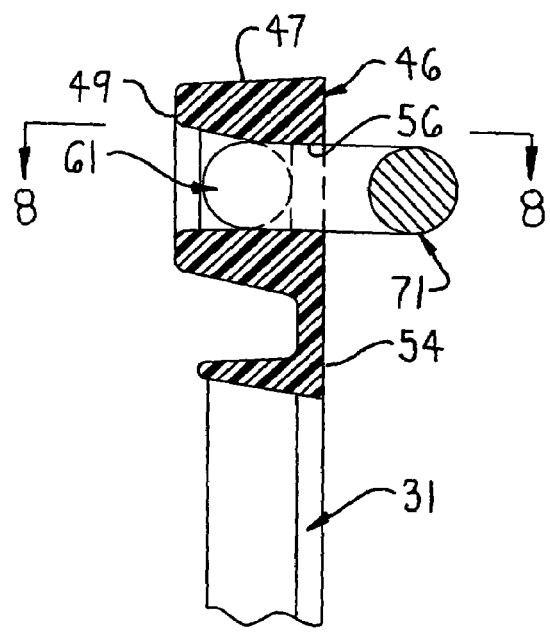

To thereafter assemble the support rod 61 to the basket 26, the free ends of the support rod legs 63–64 are inserted into the channel 48 associated with front portions of the basket side walls 31–32 so that the free ends of legs 63–64 align with the tunnels defined under the retaining bands 81. The legs 63–64 of the U-shaped support rod 61 are appropriately resiliently deflected during the mounting process to facilitate such mounting. The legs 63–64 are then slid rearwardly along the channel on the side walls 31–32 so that they pass through the tunnels defined by the retaining bands 81. Such motion is continued until the protrusions 71 substantially abut the rounded front corners 33 of the basket. The front portions of the basket side walls 31–32 are then suitably deformed inwardly due to their engagement with the protrusions 71 as the latter are pushed rearwardly of the basket. When the support rod 61 is slidably displaced rearwardly so that the protrusions 71 substantially align with the window-like openings 56, the deformation of the basket is relieved, causing the protrusions 71 to enter into and pass through the window-like openings 56 so as to assume a position substantially as illustrated in FIGS. 7 and 8. This results in the front part or bight 62 of the support rod 61 being seated in that part of the channel 48 which extends across the front wall 29 of the basket. When the legs 63–64 of the support rod 61 are inserted through the channel as provided on the basket side walls, and assuming the basket is already secured to the frame, then the rear free ends 66 of the legs 63–64 project through the openings 84 so as to protrude into the interior of the side frame members 19. The angle or slope of the front legs 75 of the protrusions 71 react or cam against the front edge walls 57 of the openings 56 so as to assist in moving the side legs 63–64 of the rod 61 rearwardly so that the rear free ends thereof protrude into the openings 84 and the front bight 62 is properly seated in the channel 48 on the basket front wall 29. The front channel members 82 are thereafter positioned downwardly over the upper edge of the front wall 29 and appropriately secured in position, as by rivets, to assist in retaining the front part 62 of rod 61 within the channel 48.

When assembled, the support rod 61 hence extends continuously along the upper rim 46 of the molded plastic basket 26 throughout the front wall and thence around the rounded corners 33 so as to extend lengthwise throughout the length of the side walls 31–32, with the support rod 61 being suitably retained in the channel 48 and connected to the handle side legs 19 through the relationship illustrated by FIGS. 8 and 9. The support rod 61 hence provides significant reinforcement along the open upper edge of the basket, both horizontally and vertically, so as to minimize distortion or deflection of the basket.

At the same time, the protrusions 71 not only assist with respect to providing positional securement of the support rod 61 by preventing the rod 61 from moving forward relative to the basket member, but these protrusions 71 also define a rounded nose part which protrudes in a cantilevered manner inwardly beyond the inner surface of the basket side walls, with these nose parts being disposed closely adjacent and spaced downwardly only a small distance from the upper edge 47. These protrusions are disposed closely adjacent but spaced rearwardly a small distance from the front wall of the basket, and hence are located so as to cooperate with the lower edge of a gate assembly associated with a second cart which is disposed in nested engagement with a first cart. That is, when first and second like carts are horizontally nested so that the basket of the first cart is nested partially into the interior of the basket of the second cart, the gate assembly on the second cart is swung upwardly to a position generally adjacent the upper edge of the basket, and the protrusions on the basket, particularly those associated with the first basket are positioned so as to prevent the upwardly-displaced gate assembly of the second cart from falling downwardly into the basket of the first cart. This hence permits the gate assemblies of the nested carts to be properly maintained in their upwardly displaced positions during nesting, and assists in preventing the carts from locking up when de-nesting is desired.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A wheeled shopping cart, comprising:

a wheeled base assembly having a horizontally extending rigid base frame, a basket support projecting upwardly from the base frame, and a pair of sidewardly-spaced upright rear frame members projecting upwardly from adjacent rear corners of said base frame;

a manually engageable handle extending generally horizontally between and joined to said upright frame members adjacent upper ends thereof;

an upwardly-opening basket molded of plastics material and having a bottom wall, an upright front wall and a pair of generally opposed side walls;

a rear gate positioned generally between upright rear edges of said basket side walls for closing off a rear open side of said basket, said gate being hingedly supported adjacent an upper edge thereof for vertical swinging movement relative to said basket;

said basket defining therein a narrow outwardly opening channel disposed directly adjacent an upper edge of said basket and extending substantially continuously along said front wall and wrapping around front corners of said basket so as to extend lengthwise along said side walls, said channel adjacent rear edges of said side walls terminating at the upright rear frame members;

a one-piece U-shaped support rod retained in said channel so as to extend substantially continuously along the upper edge of said basket;

said U-shaped support rod including a pair of elongate cantilevered side legs which divergingly and transversely project away from opposite ends of a front bight part;

each of said side legs having an integral and monolithic protrusion bent generally horizontally sidewardly from the elongate direction of the respective side leg, said protrusion being positioned adjacent but spaced rearwardly a small distance from said front bight part and protruding inwardly toward the interior of the basket;

each said side wall of said basket having a small opening which horizontally aligns and communicates with said channel and which opens inwardly through said side wall for communication with the interior of said basket; and the protrusions on said side legs projecting generally horizontally inwardly into the openings in the respective said side walls for retaining said support rod to said basket in the lengthwise direction thereof.

2. The shopping cart according to claim 1, wherein said U-shaped support rod is bent from an elongate one-piece metal rod, and said projections when viewed from above are generally U-shaped projecting parts which are bent inwardly relative to the lengthwise extent of the respective side leg and define a rounded nose part which projects through the respective opening.

3. The shopping cart according to claim 2, wherein each said side leg has elongate straight and aligned front and rear leg parts which extend lengthwise along the channel in the respective side wall, and said front and rear leg parts being joined together solely by said U-shaped projection.

4. The shopping cart according to claim 2, wherein each said upright rear frame member is an elongate hollow tube having a small access opening formed through a side wall thereof in alignment with the respective rear end of said channel, and a rear free end of a respective said side leg projecting through said opening into the interior of said upright frame member when said U-shaped protrusion is engaged in the respective side wall opening.

5. The shopping cart according to claim 2, wherein each said side wall, at a location spaced rearwardly of said opening, has one or more plastic retaining strips extending vertically and transversely across the sidewardly opening mouth of said channel to define a tunnel-like structure which retains the side leg in the channel.

6. The shopping cart according to claim 5, wherein each said upright rear frame member is an elongate hollow tube having a small access opening formed through a side wall thereof in alignment with the respective rear end of said channel, and a rear free end of a respective said side leg projecting through said opening into the interior of said upright frame member when said U-shaped protrusion is engaged in the respective side wall opening, whereby the rear end parts can engage an edge wall of said access opening for transferring loads from said basket to said upright rear frame member.

7. The shopping cart according to claim 2, wherein each said side wall has an outwardly opening recess formed therein adjacent the upright rear edge thereof and extending vertically along the extent of said upright rear edge, the respective upright rear frame member being seated in the recess, and the side wall adjacent said rear edge being fixedly secured to the respective upright rear frame member.

8. The shopping cart according to claim 1, wherein each said side leg has elongate straight and aligned front and rear leg parts which extend lengthwise along the channel in the respective side wall, and said front and rear leg parts being joined together solely by said U-shaped projection.

9. The shopping cart according to claim 1, including a pair of sidewardly-spaced channel members fixedly mounted on and fitted downwardly over the upper edge of said front wall so that a front leg on each said channel member protrudes downwardly over said channel and the bight part positioned therein.

10. The shopping cart according to claim 1, wherein the protrusion on the support rod, in plan view, is U-shaped and has a rounded nose part defined at the base thereof, said nose part protruding inwardly a substantial distance beyond an inner side surface of said side wall.

11. A wheeled shopping cart, comprising:

a wheeled base assembly having a horizontally extending rigid base frame and a basket support arrangement projecting upwardly from the base frame;

an upwardly-opening basket molded of plastics material and having a bottom wall fixedly supportingly engaged with the basket support arrangement associated with the base assembly;

said upwardly-opening basket being a one-piece, integral and monolithic molded plastic construction having an upright sidewall arrangement which is integrally and monolithically molded to and projects upwardly from an outer edge of said bottom wall, said upright sidewall arrangement defining solely three sides of the basket and defining an upright front wall and a pair of generally opposed upright side walls which are joined through front corners to said upright front wall, a rear side of said one-piece molded construction being open;

a pair of upright frame members rigidly fixed to said base assembly and projecting upwardly generally along and rigidly secured to said side walls adjacent rear upright edges thereof;

a manually engageable handle extending generally horizontally between and joined to said upright frame members adjacent upper ends thereof so that said handle extends transversely across said basket adjacent a rear upper edge thereof;

said one-piece molded construction defining therein a narrow outwardly-opening channel disposed directly adjacent an upper edge of said upright sidewall arrangement and extending substantially continuously along said front wall adjacent its upper edge and wrapping around said front corners and then extending lengthwise along said side walls adjacent the upper edge thereof so that said channel terminates adjacent the upright rear edges of said side walls;

each said side wall having a small window-like opening which communicates with said channel and which opens horizontally inwardly through said side wall for communication with the interior of said basket, said window-like opening being disposed closely adjacent the respective corner which joins the respective side wall to said front wall;

a one-piece U-shaped support rod positioned in said channel so as to extend substantially continuously along said upright sidewall arrangement adjacent the upper edge thereof;

said U-shaped support rod including a front bight part which is of a length corresponding to the channel defined in the front wall of said basket and which at opposite ends joins through bent corners to a pair of elongate cantilevered side legs which project transversely away from opposite ends of said front bight parts, each said side leg terminating in a free end, said front bight part and said pair of elongate cantilevered side legs being an integral and monolithic one-piece construction shaped from an elongate steel rod; and each of said side legs having a protrusion fixed thereto and projecting generally horizontally sidewardly in a cantilevered fashion away from the elongate direction of the respective side leg, said protrusion being positioned adjacent but spaced rearwardly a small distance from said front bight part and protruding inwardly through the respective window-like opening toward and into the interior of the basket when the U-shaped support rod is engaged within the channel.

12. The shopping cart according to claim 11, wherein the protrusion is integrally and monolithically joined to and formed with the respective side leg.

13. The shopping cart according to claim 11, wherein said channel as it extends along said side wall terminates directly adjacent the upright frame member, said upright frame member being a hollow metal tube having an opening extending through a side wall thereof in communication with said channel, and the rear free end of said side leg protruding through said opening into the interior of said upright frame member.

14. The shopping cart according to claim 11, wherein each said side wall of said one-piece basket has at least one plastic retaining strip extending vertically and transversely across the sidewardly-opening mouth of said channel to define a tunnel-like structure which retains the side leg of the U-shaped support in the channel, said retaining strip being positioned in rearwardly spaced relationship from the window-like opening.

15. The shopping cart according to claim 14, wherein the protrusion is integrally and monolithically joined to and formed with the respective side leg.

16. The shopping cart according to claim 11, wherein the protrusion has a rounded configuration adjacent an inner free end thereof and is disposed so as to project inwardly beyond an inner side surface of the respective side wall so as to permit it to function as a rear gate support when baskets of similar shopping carts are longitudinally partially nested one within another.

* * * * *